(12) United States Patent
Hu et al.

(10) Patent No.: US 6,271,939 B1
(45) Date of Patent: Aug. 7, 2001

(54) TRANSPARENT AND FLATBED SCANNER

(75) Inventors: Darwin Hu; Alpha Hou, both of San Jose, CA (US)

(73) Assignee: Syscan, Inc., San Jose, CA (US)

( * ) Notice: Subject to any disclaimer, the term of this patent is extended or adjusted under 35 U.S.C. 154(b) by 0 days.

(21) Appl. No.: 09/206,836

(22) Filed: Dec. 7, 1998

Related U.S. Application Data (63) Continuation-in-part of application No. 09/119,704, filed on Jul. 20, 1998.

(51) Int. Cl.$^7$ ........................................... H04N 1/04

(52) U.S. Cl. ..................... 358/497; 358/473; 358/474

(58) Field of Search .................... 358/473, 497, 358/494, 471, 400, 472, 474, 408, 496; 250/208.1; 382/313; 399/211

(56) References Cited

U.S. PATENT DOCUMENTS 6,160,642 * 12/2000 Mui et al. ............................. 358/497

* cited by examiner

Primary Examiner—Cheukfan Lee
(74) Attorney, Agent, or Firm—Joe Zheng (57) ABSTRACT

An improved flatbed scanner comprises a frame transparent scanner and a cradle having a lid. The frame transparent scanner is a stand-alone portable scanner that can scan both transparent and opaque scanning objects. When the frame transparent scanner is rested in the cradle, a flatbed scanner, appearing as a regular flatbed scanner, is structured. The operations are no different from that of the regular flatbed scanner. One of the advantages and benefits of the disclosed flatbed scanner is that a user no longer has to have two scanners, typically one for mobile applications and one for stationary applications. With the current disclosed flatbed scanner, the user can take the frame transparent scanner off the cradle for the mobile applications and rest the frame transparent scanner in the cradle for office uses.

18 Claims, 9 Drawing Sheets

TRANSPARENT AND FLATBED SCANNER

CROSS-REFERENCE TO RELATED APPLICATION

This application is a continuation-in-part of U.S. application Ser. No. 09/119,704, filed Jul. 20, 1998, and entitled "Frame Transparent Scanner" by the same inventors hereof, which is hereby incorporated by reference in its entirety.

BACKGROUND OF THE INVENTION

1. Field of the Invention

The present invention generally relates to flatbed scanning systems and more particularly relates to a flatbed scanner comprising a frame transparent scanner and a cradle, wherein the frame transparent scanner permits users to exam scanning objects directly before a scanning operation starts.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert objects, including pictures and papers, to images that can be used, for example, for building Web pages and optical character recognition. The optical scanners are sometimes referred to as image scanners as the output thereof is generally in digital images.

Figure 1:
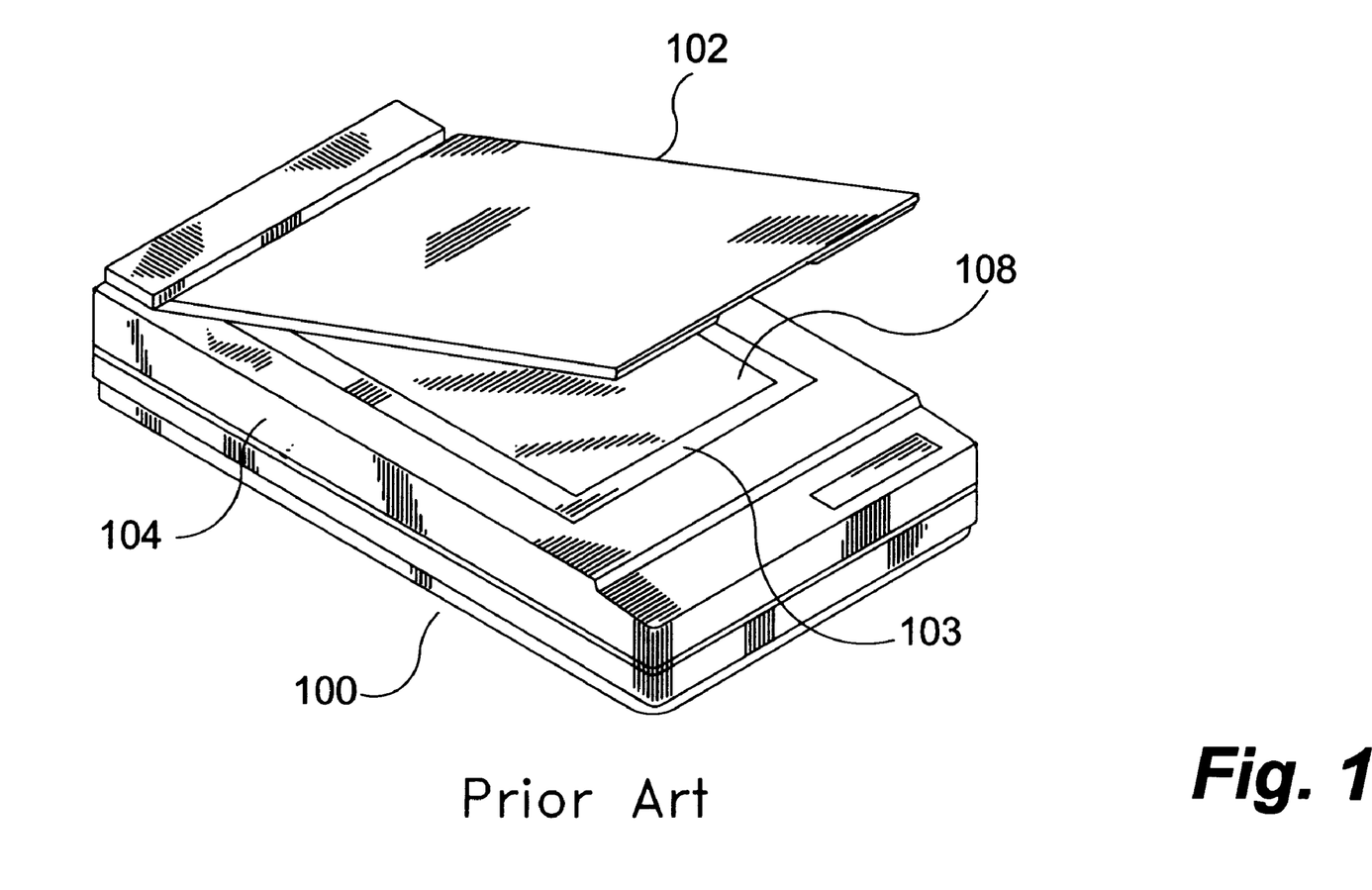
FIG. 1 demonstrate a perspective view of a flatbed scanner in the current market.

FIG. 1 demonstrates a flatbed scanner 100. Similar to a copy machine, flatbed scanner 100 includes a cover or lid 102 and a glass panel 103. Generally a scanning document 108 must be placed on glass panel 103 and faced down with lid 102 closed, so that an image sensing mechanism or imager in compartment 104 can properly scan scanning document 108.

Flatbed scanner 100 is suitable for many applications, however, it demonstrates many inconveniences in some daily applications. For example, it is difficult to scan pages of a thick book using flatbed scanner 100, in which lid 102 becomes awkward to use because it can be hardly closed due to the thickness of the book. If lid 102 does not cover a scanning page properly, a resultant image thereof would have undesirable artifacts. Further, flatbed scanner 100 does not permit a user to project in advance what a resultant image could be until the image is actually generated. For example, the user wants to scan a scanning object at a desired angle. With the requirement of having a scanning object faced down and lid 102 covered, there is no convenient way for the user to see and align the scanning document properly before examining the resultant images from repeated trials. Furthermore, the operational concept of flatbed scanner 100 is somehow derived from a copy machine in which front illumination is provided, the reflectance from the scanning document is captured therefrom to generate an image. It is, therefore, sometimes difficult to use flatbed scanner 100 to scan a transparent or negative object such as X-ray films, mylar films for overhead projectors or films for CAD and photography.

A regular flatbed scanner becomes an important input interface to a host computer and is needed for many regular tasks in offices and homes. But it is not always acceptable to have two types of scanners. Thus there is a great need for a new scanner that can perform what a regular flatbed scanner does but also provide means to overcome the above listed problems with the flatbed scanner. In addition, there is another need for a new scanner that is really lightweight and portable so that a user can carry it around, for example, in library to scan pages from a reference book.

SUMMARY OF THE INVENTION

The present invention has been made in consideration of the above described problems and needs and has particular applications for both portable and stationary uses. An improved flatbed scanner is disclosed and comprises a frame transparent scanner and a cradle including a base and a lid. The frame transparent scanner is a stand-alone portable scanner that can scan both transparent and opaque scanning objects. When the frame transparent scanner is rested in the cradle, a flatbed scanner, appearing as a regular flatbed scanner, is structured. The operations are no different from that of the regular flatbed scanner. One of the advantages and benefits of the disclosed flatbed scanner is that a user no longer has to have two scanners, typically, one for mobile applications and one for stationary applications. With the current disclosed flatbed scanner, the user can take the frame transparent scanner off the cradle for the mobile applications and rest the frame transparent scanner in the cradle for stationary office or home uses.

According to one embodiment, the improved flatbed scanner comprises:

a self-operable frame transparent scanner having a front transparent panel and a back transparent panel and an elongated imager therebetween; wherein the imager scans a scanning object to produce an image of the scanning object when the front transparent panel is placed upon the scanning object and an operation command is activated;

a cradle having a base, a lid and secure means for affixing the frame transparent scanner to the cradle when the frame transparent scanner is placed into the cradle with the front transparent panel facing up; and the frame transparent scanner scanning a scanning sheet placed against the front transparent panel of the frame transparent scanner by the lid to produce an image of the scanning sheet when the operation command is activated.

Objects and features of the present invention, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D depicts a portion of the cross-section view of the frame transparent scanner of FIG. 2C to show a pair of transparent panels along with an imager (e.g. contact image sensor) in between;

DETAILED DESCRIPTION OF THE PREFERRED EMBODIMENTS

The present invention discloses an improved flatbed scanner that comprises a frame transparent scanner and a cradle having a lid. The frame transparent scanner is a stand-alone portable scanner that can scan both transparent and opaque scanning objects. When the frame transparent scanner is rested in the cradle, a flatbed scanner, appearing as a regular flatbed scanner, is structured. The operations of the flatbed scanner herein are no different from that of the regular flatbed scanner but the advantages and benefits thereof are numerous. For example, a user does not have to have two scanners for different applications, typically, one for mobile applications and one for stationary applications. With the current disclosed flatbed scanner, the user can take the frame transparent scanner off the cradle for the mobile applications and rest the frame transparent scanner in the cradle for office uses. Other advantages and benefits will be appreciated in the following detailed descriptions.

Figure 2A:
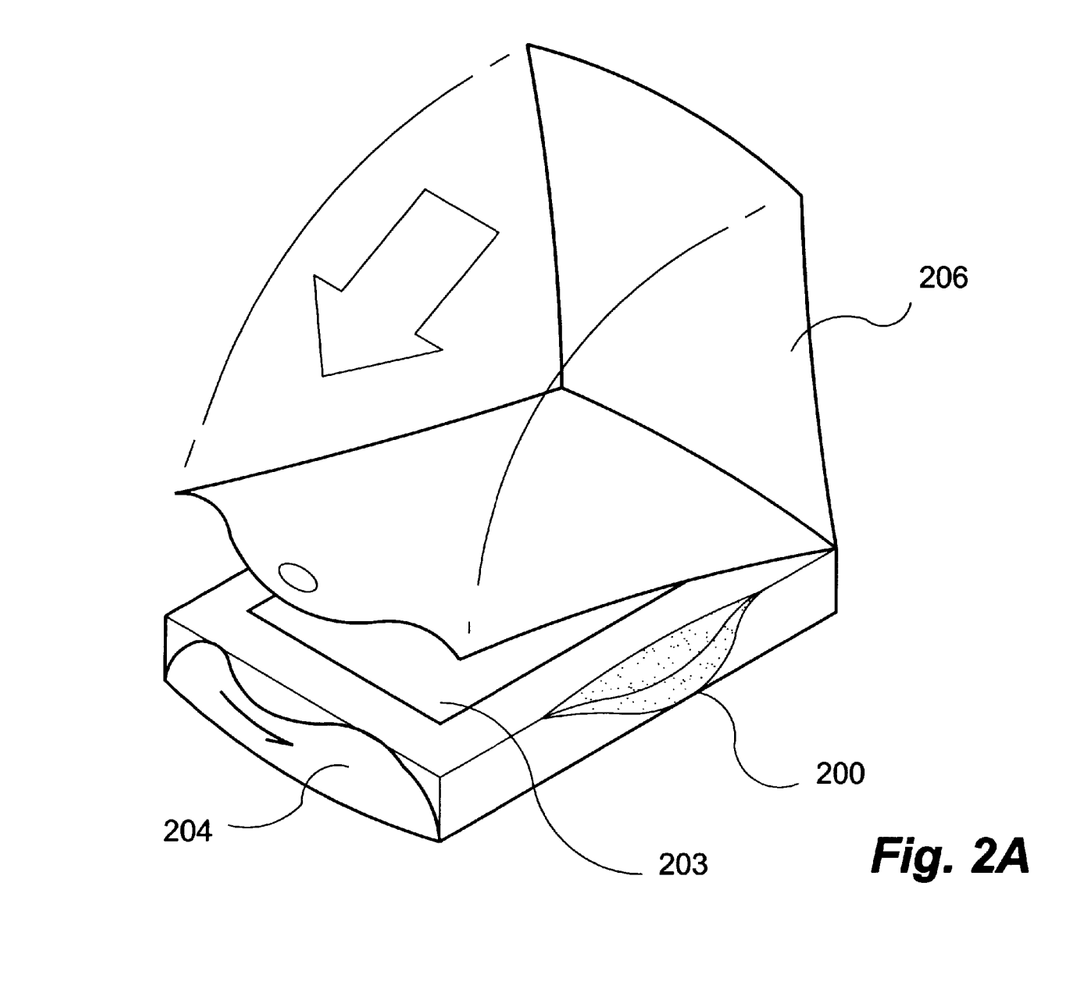
FIG. 2A shows a perspective view of an improved flatbed scanner according to one embodiment of the present invention.

Referring now to the drawings, in which like numerals refer to like parts throughout the several views. FIG. 2A shows a perspective view of an improved flatbed scanner 200 according to one embodiment of the present invention. Scanner 200 comprises a transparent frame scanner 202, a lid 206 and a docking station or cradle 204. As shown in the figure, the operation of scanner 200 is no different from a regular flatbed scanner such as 100 in FIG. 1, namely a scanning sheet can be placed against front or scanning panel 203 by lid 206 (closed). Similar to a photocopy machine, scanner 200 scans the scanning sheet and generates an image thereof.

As described below, what makes scanner 200 fundamentally different from a regular flatbed scanner is that scanner 200 is modular, namely transparent frame scanner 202 in scanner 200 is removably mounted therein and can be dismounted to scan other scanning objects, and further transparent frame scanner 202 itself is operable and will be described more detail below.

Figure 2B:
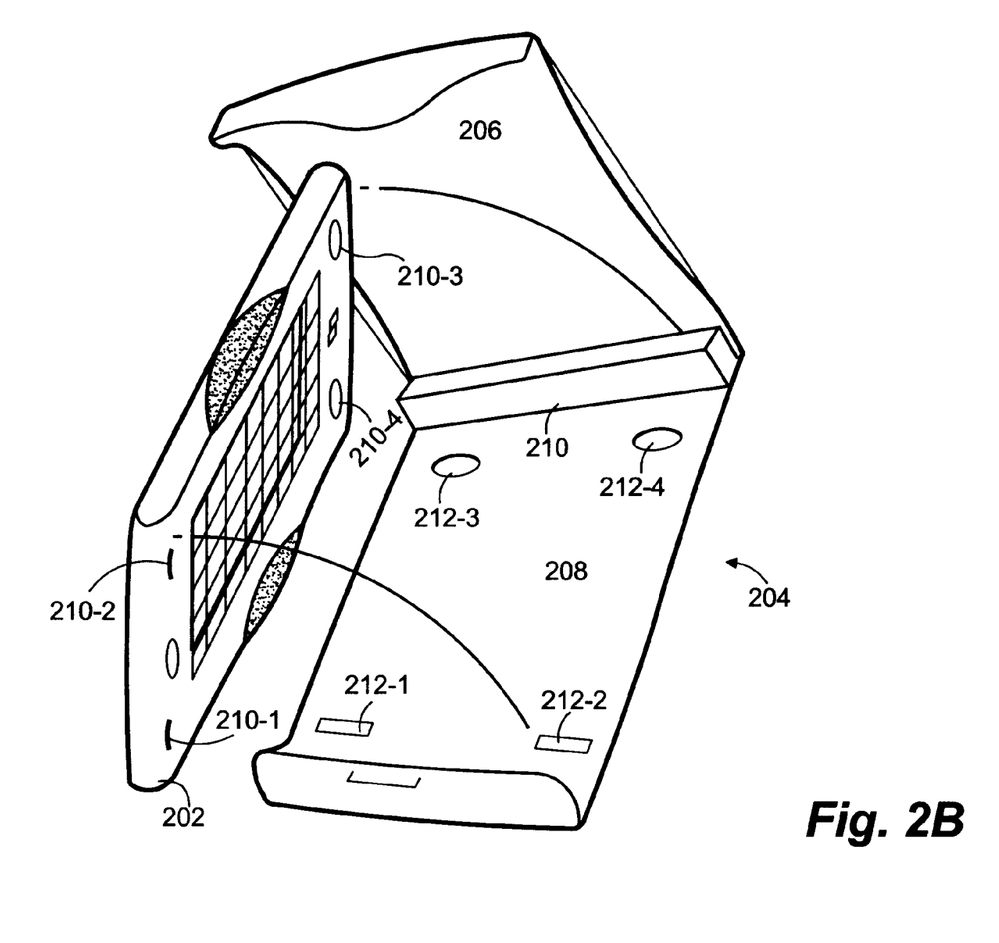
FIG. 2B shows a perspective view of a transparent frame scanner and a cradle with reference to FIG. 2A.

FIG. 2B shows a perspective view of transparent frame scanner 202 and cradle 204 according to one embodiment of the present invention. As is shown, transparent frame scanner 202 can be removably and securely affixed in cradle 204 when there is a need to convert transparent frame scanner 202 together with cradle 204 into a flatbed scanner 200 of FIG. 2A functioning as a regular flatbed scanner.

Cradle 204 comprises a base 208 and lid 206, optionally a compartment 210. Base 208 provides a mechanism to support and hold transparent frame scanner 202 when transparent frame scanner 202 is placed into base 208. Preferably, on one side of transparent frame scanner 202, there are a couple of extended members 210 that can be inserted into and removably latched in receptacles 212 of base 208. Optionally, one of extended members 210 can provide means for electronic connection to cradle 204. For example, cradle 204 provides a means for charging rechargeable batteries in transparent frame scanner 202 and typically the charging means is concealed in compartment 210. Then through the electronic connection provided in the connector, rechargeable batteries in transparent frame scanner 202 can be recharged when transparent frame scanner 202 is rest in cradle 204.

Generally, cradle 204 is made of and molded out of a solid plastic material. Preferably base 208 is a flat panel and provides a grasping means to grasp transparent frame scanner 202 so transparent frame scanner 202 would not fall off cradle 204 when transparent frame scanner 202 is therein.

One of the advantages in the present invention is to have an effective mechanism that can turn a transparent frame scanner into a regular flatbed scanner with minimum efforts. FIG. 2A shows one embodiment of the present invention, in which transparent frame scanner 202 can be easily placed onto cradle 204 and taken out therefrom. However, the particularities shown in the figure and described do not necessarily imply the particular limitations to the present invention. From the given descriptions, those skilled in the art may derive different kinds of transparent frame scanners and corresponding cradles or docking stations. For example, a transparent frame scanner and a cradle may be mutually so shaped that the transparent frame scanner mates well into the cradle, in which case there is no need for the transparent frame scanner to have any extended members to be grasped by the cradle. Alternatively, a locking means can be designed in the cradle to clasp a transparent frame scanner that can be later dismounted from the cradle when the locking means is released. In addition, many features may be introduced into the cradle to provide additional features to the transparent frame scanner or subsequently structured flatbed scanner since a cradle is generally stationary and does not have to be necessarily limited by the size or weight. Those features may include, but not be limited to, an electronic adapter for transporting images generated in the transparent frame scanner to a certain standard input/output port, storage devices for storing the images from the transparent frame scanner, and auxiliary electronic circuitry to provide additional capabilities to the transparent frame scanner when the transparent frame scanner is removably and securely affixed in the cradle.

To further understand the principle of the present invention, a detailed description of a frame transparent scanner and the advantages it provides are provided below.

Figure 2C:
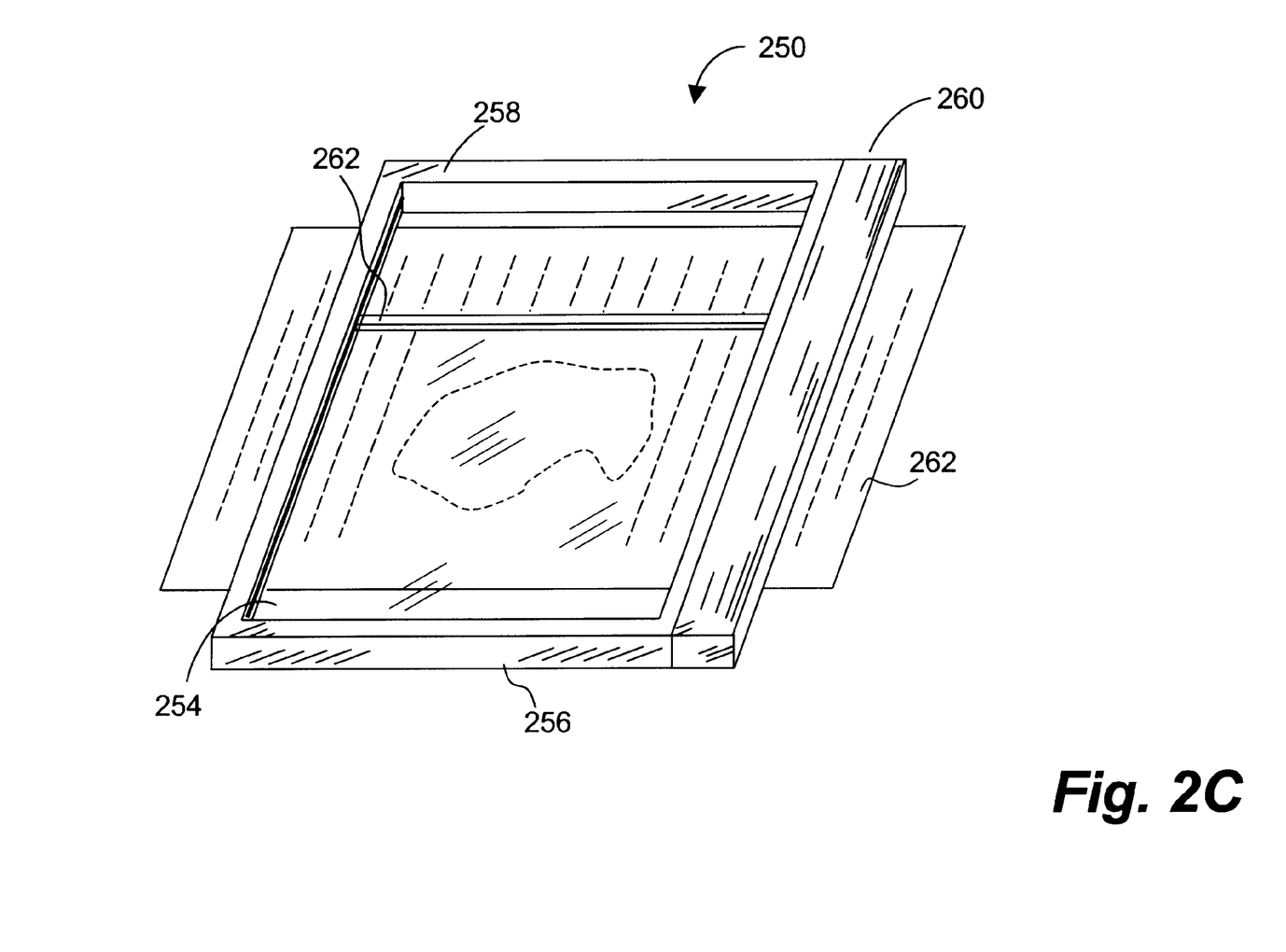
FIG. 2C shows a perspective view of a frame transparent scanner in one embodiment of the present invention.

FIG. 2C shows a frame transparent scanner 250 over a scanning object 252. Frame transparent scanner 250 can be used together with the above described cradle to form a flatbed scanner according to one embodiment of the present invention. Frame transparent scanner 250 comprises a pair of flat transparent panels 254 and 256 that might be more visible in a cross-section display in FIG. 2D. Both top panel 254 and bottom panel 256 may be made of glass or transparent plastic material with a uniform thickness, for example, 3 millimeters or one eighth of an inch. Further top panel 254 and bottom panel 256 are kept spaced, for example, 0.5 inch, apart and integrated into a frame 258. Frame 258 may be made of lightweight but preferably solid material, such as aluminum or rigid plastic material.

Frame holder 260, an optional feature, provides the convenience for a user to hold frame transparent scanner 250 and may provide a compartment to host all the electronic and mechanic components therein. As the electronic and mechanic components to operate a scanner are known to those skilled in the art, they are not to be described in detail herein to avoid unnecessarily obscuring aspects of the present invention. However, it should be understood that frame holder 260 is a preference and not a necessity to practice the present invention. Those skilled in the art understand that the electronic and mechanic components can be integrated around the frame edges without affecting the operations of the present invention.

Figure 2D:
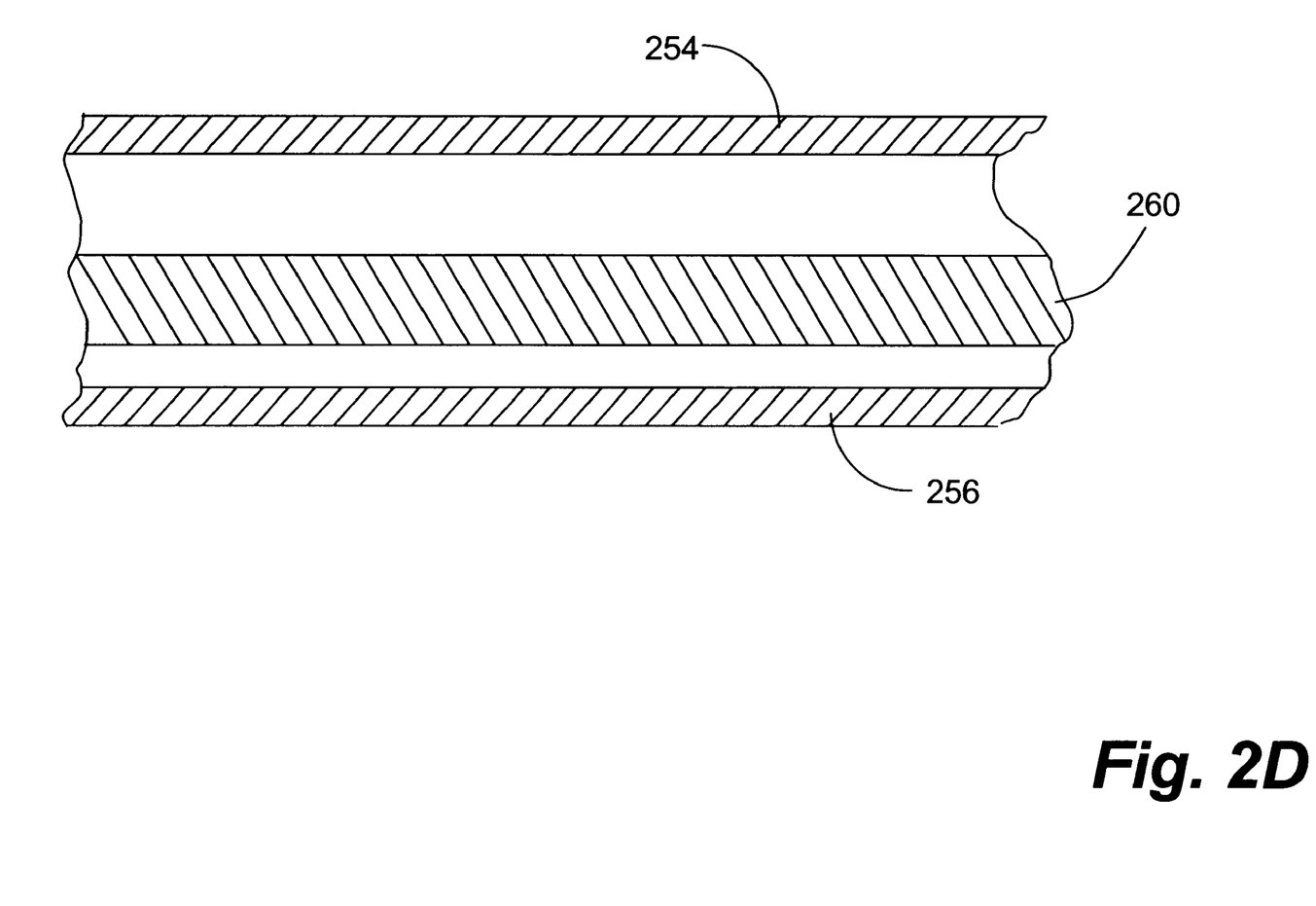

Between top panel 254 and bottom panel 256, there is an imager 262 that is used to generate an image of scanning object 252. Imager 262 is a contact image sensor (CIS) that may be CIS 100 from Scanvision Incorporated having a business address at 1346 Ridder Park Drive, San Jose, Calif. 95131. The hollow space preserved by top panel 254 and bottom panel 256 that are spaced apart provides a space for imager 262 to move along from one end of frame transparent scanner 250 to the other end of frame transparent scanner 250 so that scanning object 252 can be fully scanned. A motion mechanism, not shown in the figure and known to those skilled in the art is responsible for moving imager 262 at a linear and controlled speed after a command to start scanning is activated. According to one embodiment, imager 262 is moved by the motion mechanism.

Figure 2E:
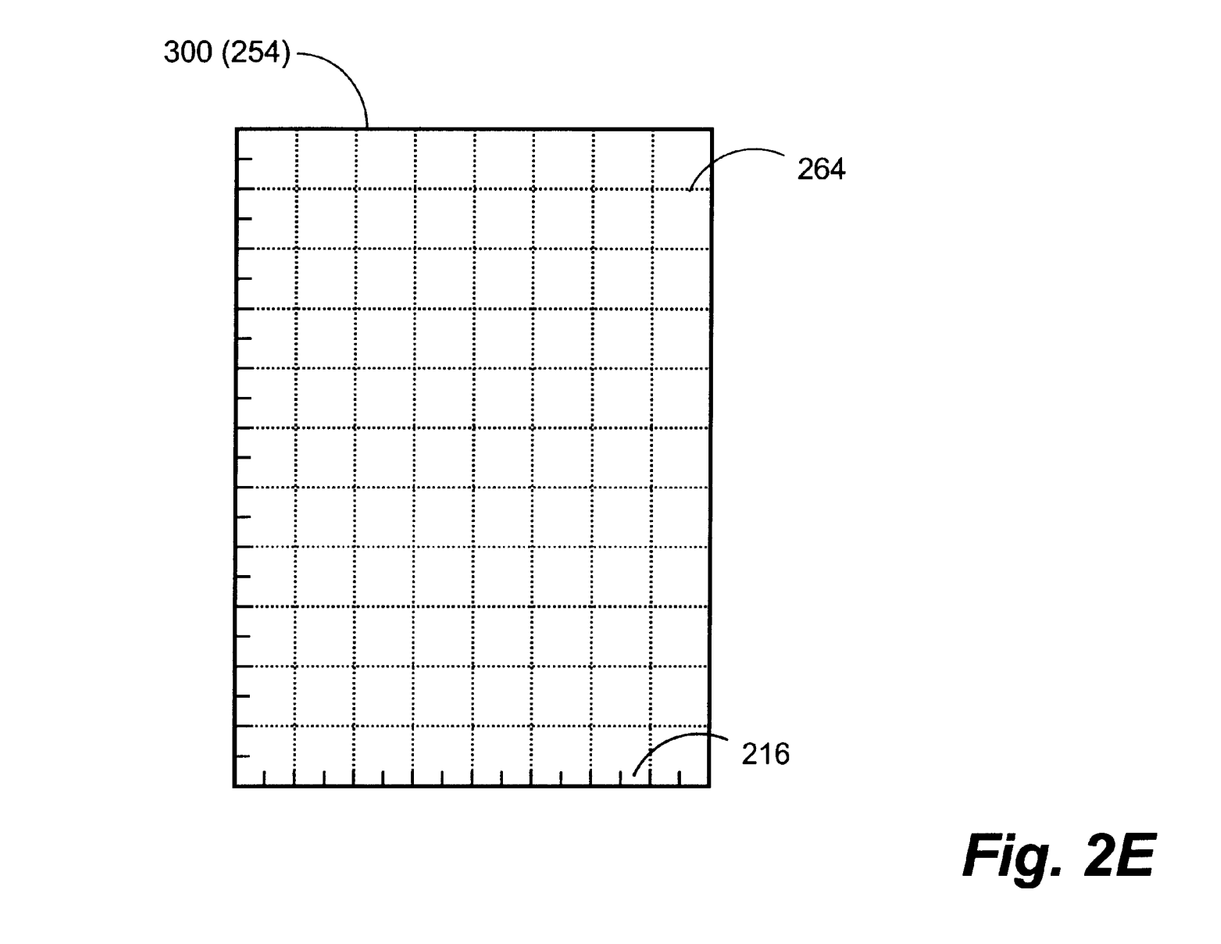
FIG. 2E depicts an exemplary bottom panel having a scale thereon to assist a user to align a scanning object with respect to the scale.

Given scanning object 262, frame transparent scanner 250 is placed onto scanning object 252. Because frame transparent scanner 250 is indeed transparent through the pair of top transparent panel 254 and bottom transparent panel 256, a user can see through and perform necessary adjustments till satisfactory. Then the scanning operation starts, namely imager 262 scans scanning object 252 from one end to the other, producing an image thereof. According to another embodiment, top transparent panel 254 may be itched or printed a scale. FIG. 2E shows an exemplary top transparent panel 254 in which a set of grids 264 is printed thereon so that a user can align frame transparent scanner 250 over a scanning document with reference to grids 264. Further top transparent panel 254 may have a scale 266 printed thereon. Scale 266 helps the user to predetermine where exactly a scanning object should appear in a resultant image thereof.

Figure 3A:
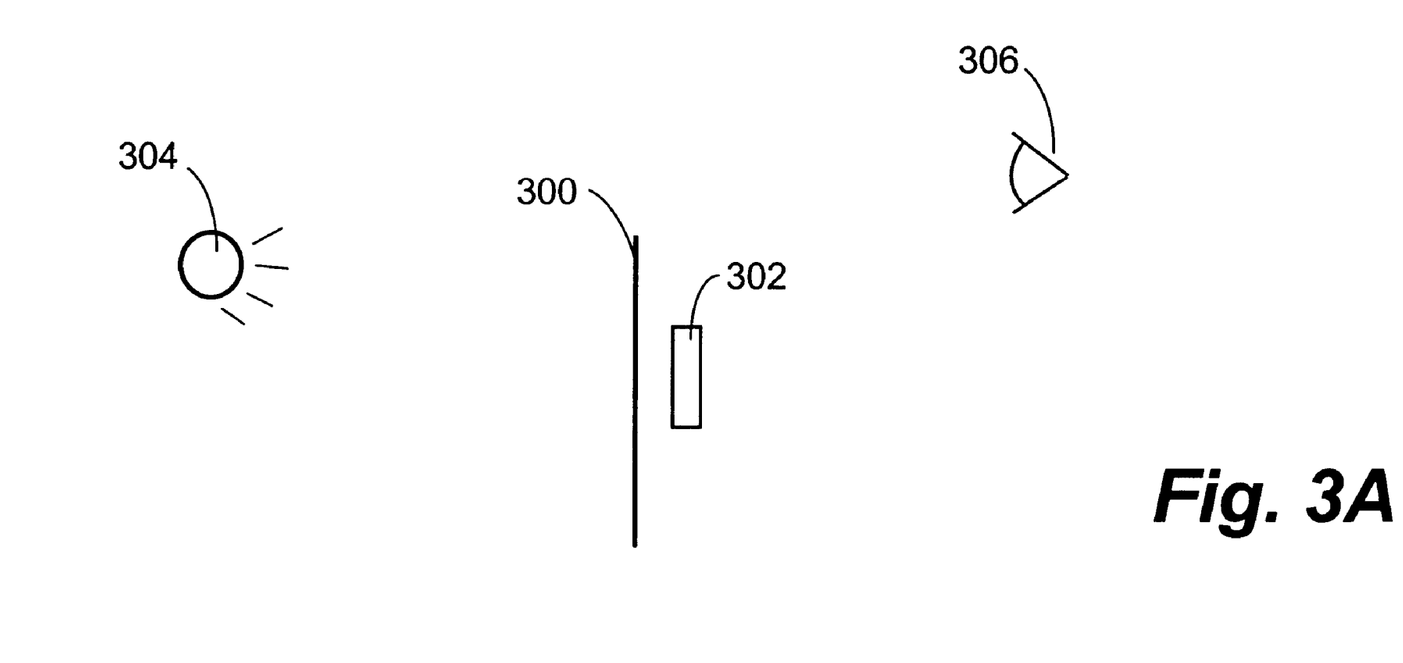
FIG. 3A shows the concept of back illumination.

It can be now appreciated by those skilled in the art that frame transparent scanner 250 provides the convenience for a user to perform adjustments before a scanning actually starts. Additionally, one of the key features in the present invention is the possibility of using back-illumination that is impossible in regular flatbed scanners. To be more specific, scanning object 252 may be a negative or transparent object such as an X-ray film. Scanning transparent object has to use a back illumination, namely a light source is from the back of the transparent object as shown in FIG. 3A in which a transparent object 300 is paced between an imager 302 and a light source 304. From the perspective of imager 302, light source 304 provides back illumination to transparent object 300 so that imager 302 can scan transparent object 300. In one environment, light source 304 can be the natural light from the Sun, thus transparent object 300 could be placed against a window and then frame transparent scanner 200 of FIG. 1 could be placed over scan transparent object 300 without using an internal illumination source in imager 212.

Figure 3B:
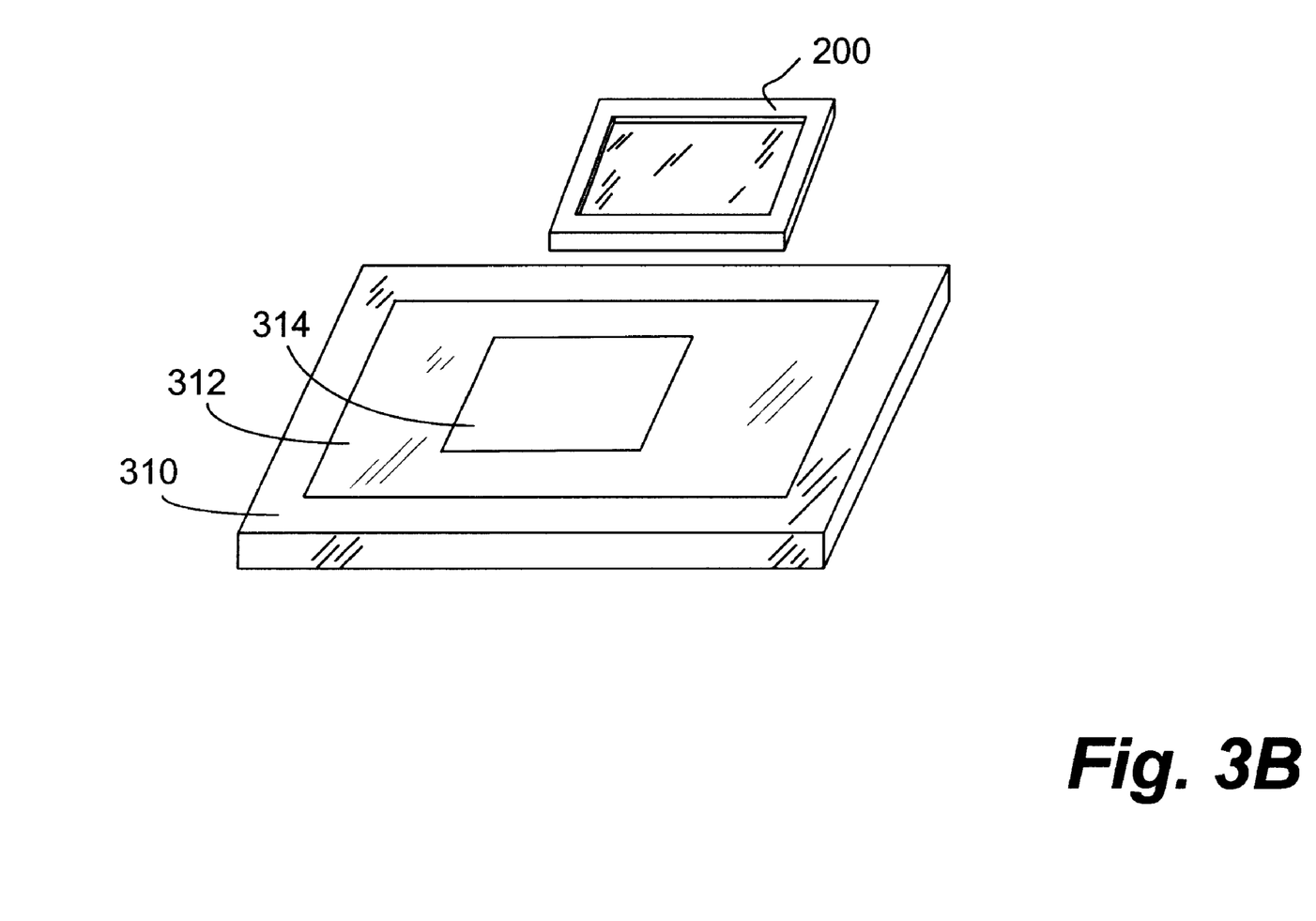
FIG. 3B demonstrates the use of a flatbed scanner over a transparent film illuminated by a light table.

FIG. 3B demonstrates how frame transparent scanner 200 of FIG. 1 scans a film using a light table 310. It is understood that light table 310 provides a uniform lighting condition in which either an positive or negative film can be viewed. A film 314 is placed upon the surface 312 of light table 310 so that a user can clearly view film 314 with the help of back illumination provided by light table 310. Frame transparent scanner 200 can be placed over film 314 and the user may perform desired adjustment through the transparent panels of the scanner and subsequently scans the film with the back illumination.

Figure 4:
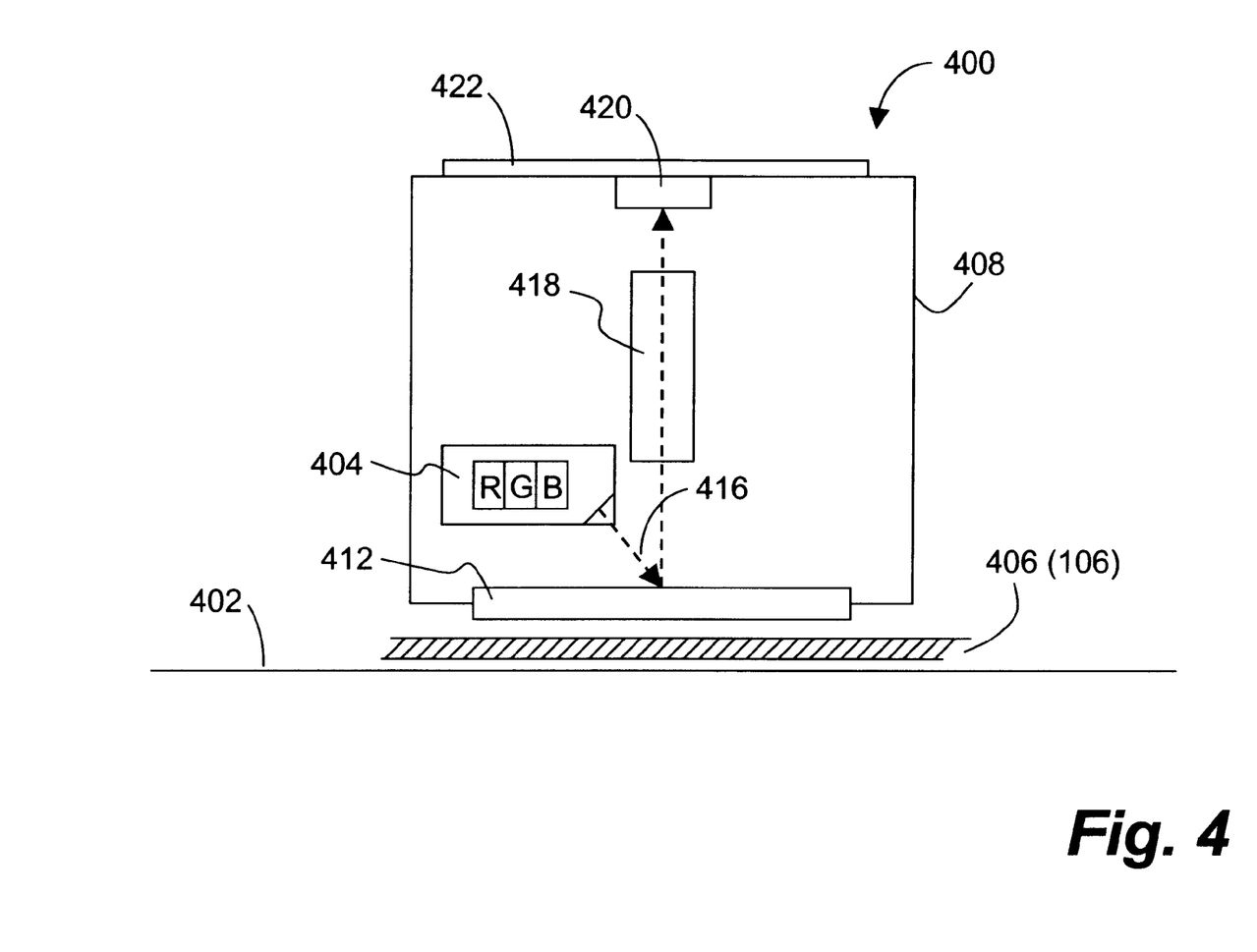
FIG. 4 depicts a pictorial view of the contact image sensor used in the frame transparent scanner of FIG. 2C.

To further understand the present invention, referring now to FIG. 4, there is shown a cross section view of a typical contact image sensor 400 that is preferably used as an imager in frame transparent scanner 200 of FIG. 2A. A color light source 404 provide 3 different illuminations, e.g. red, green, and blue lights, to a scanning object 402 facing up under bottom panel 406 that corresponds to 256 of FIG. 2C. Typically, contact image sensor 400 is made in a modular elongated tube 408 and opening 412 facing scanning object 402 may be preferably protected by a transparent material. When the light source 414 emits light through cover opening 412 onto scanning object 402 as indicated by 416, the light reflected from scanning object 402 again through opening 412 is directed at optical lens 418. Generally optical lens 418 is an array of one-to-one erect graded index micro (cylindrical or rod) lens. It should be understood that the present invention is independent of the optical lens and the light source. The use of the particular light source and the lens array in this configuration facilitate the description of the present invention and impose no limitation thereof. Further, light source 404 can be controlled on and off, particularly turned off when a transparent scanning object is being scanned under back illumination but must be turned on when used in a cradle. Directly above optical lens 418, there is an image sensor 420 comprising an array of photodetectors made of CMOS or CCD sensors. The array is typically a one-dimensional array, often referred to as a linear sensor. The optical lens 418 collects the reflected light onto the photodetectors that convert the reflected light to electronic signals proportionally representing the intensity of the reflected light. The electronic signals are then transferred to data bus 422 for readout operations.

For scanning object 402 under bottom panel 406 to be completely scanned, contact image sensor 400 has to move along scanning object 402. The motion of contact image sensor 400 is performed by a moving mechanism, not shown in the figure, that determines the scanning resolution. In other words, the moving speed is conformed to the image vertical resolution in the resultant image and hence synchronized by a sensor clock signal that may be generated from an oscillator. These are well known in the art and not to be discussed further herein.

It should be pointed that FIG. 4 is illustrated for the case that a frame transparent scanner is operated for scanning either a transparent or opaque scanning object, namely the frame transparent scanner is placed upon the scanning object. When the frame transparent scanner is placed into a cradle as shown in FIG. 2A, top panel 254 FIG. 2C is actually faced towards base 208 and bottom panel 256 (scanning panel) is faced up. Similar to operating a regular flatbed scanner, a user places a scanning sheet faced downward (towards the scanning panel) and closes lid 206. The imager in the transparent scanner can therefore scan the scanning sheet.

The present invention has been described in sufficient detail with a certain degree of particularity. It is understood to those skilled in the art that the present disclosure of embodiments has been made by way of examples only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. An improved flatbed scanner comprising:
   a frame transparent scanner;
   a cradle having a lid, the cradle including a mechanism to grasp the frame transparent scanner when the frame transparent scanner is removably placed in the cradle; and
   wherein the frame transparent scanner scans an opaque object when the frame transparent scanner is in the cradle and scans a transparent object when the frame transparent scanner is out of the cradle.

2. The improved flatbed scanner of claim 1; wherein the frame transparent scanner comprises:
   a frame having a front side and a back side;
   a first flat transparent panel mounted in the front side of the frame;
   a second flat transparent panel mounted in the back side of the frame; so that a hollow space is formed between the first flat panel and the second flat transparent panel mounted in the frame;
   an elongated imager integrated movably between the first panel and the second flat transparent panel; and
   wherein the elongated imager moves horizontally to scan a scanning object when the back side of the frame transparent scanner is placed upon the scanning object to produce an image of the scanning object.

3. The improved flatbed scanner of claim 2; wherein the first flat panel includes a reference mark thereon so that a user can align the scanning object with respect to the reference mark before a command is executed to take the image of the scanning object by the imager.

4. The improved flatbed scanner of claim 3; wherein the imager comprises a light source, the light source kept on to scan the scanning object by the imager when the scanning object is opaque.

5. The improved flatbed scanner as recited in claim 3, wherein the imager comprises a light source, the light source kept off to scan the scanning object by the imager when the scanning object is transparent.

6. The improved flatbed scanner as recited in claim 3, wherein the second flat transparent panel faces up when the frame transparent scanner is removably placed onto the cradle.

7. The improved flatbed scanner as recited in claim 6, wherein the imager comprises a light source, the light source is turned on to scan the scanning sheet by the imager when the scanning sheet is placed against the second flat transparent panel by the closed lid.

8. The improved flatbed scanner as recited in claim 1, wherein further a compartment is formed in the cradle to conceal an electronic circuitry.

9. The improved flatbed scanner as recited in claim 8, wherein the electronic circuitry charges rechargeable batteries in the frame transparent scanner when the transparent scanner is placed in the cradle.

10. An improved flatbed scanner comprising:
    a self-operable frame transparent scanner having a front transparent panel and a back transparent panel and an elongated imager therebetween; wherein the imager scans a scanning object to produce an image of the scanning object when the front transparent panel is placed upon the scanning object and an operation command is activated;
    a cradle having a base, a lid and secure means for affixing the frame transparent scanner to the cradle when the frame transparent scanner is placed into the cradle with the front transparent panel facing up; and
    the frame transparent scanner scanning a scanning sheet placed against the front transparent panel of the frame transparent scanner by the lid to produce an image of the scanning sheet when the operation command is activated.

11. The improved flatbed scanner as recited in claim 10, wherein the back transparent panel includes a scale so that a user can see through both the front and back transparent panels and adjust the scanning object against the scale before the operation command is activated.

12. The improved flatbed scanner as recited in claim 11, wherein the back transparent panel faces the base of the cradle when the frame transparent scanner is placed into the cradle.

13. The improved flatbed scanner as recited in claim 10, wherein the cradle further includes an electronic circuitry.

14. The improved flatbed scanner as recited in claim 13, wherein the electronic circuitry is concealed in a compartment formed in the cradle.

15. The improved flatbed scanner as recited in claim 14, wherein the electronic circuitry charges batteries used in the frame transparent scanner when the frame transparent scanner is placed into the cradle.

16. The improved flatbed scanner as recited in claim 14, wherein the electronic circuitry provides an input/output function to communicate image data between the frame transparent scanner and a host computer, wherein the image data is generated from the frame transparent scanner.

17. An improved flatbed scanner comprising:
    a self-operable frame transparent scanner having a front transparent panel and a back transparent panel and an elongated imager therebetween; the back transparent panel including a scale for a user to align a scanning object under; wherein the imager scans a scanning object to produce an image of the scanning object when the front transparent panel is placed upon the scanning object and an operation command is activated;
    a cradle having a base having two ends, a raised wall at one end of the base, and a lid pivotally connected to the other end of the base and secure means for affixing the frame transparent scanner to the cradle when the frame transparent scanner is placed into the cradle with the front transparent panel facing up and the back transparent panel facing the base; and
    the frame transparent scanner scanning a scanning sheet placed against the front transparent panel of the frame transparent scanner when the lid is closed, the frame transparent producing an image of the scanning sheet when the operation command is activated.

18. The improved flatbed scanner as recited in claim 17, wherein the cradle establishes electronic connections with the frame transparent scanner when the frame transparent scanner is placed into the cradle.

* * * * *